US008045524B2

(12) United States Patent
Kim et al.

(10) Patent No.: US 8,045,524 B2
(45) Date of Patent: Oct. 25, 2011

(54) EFFICIENT RESOURCE UTILIZATION WITH INTERLACE AND/OR INTERLACE OFFSET SWITCHING

(75) Inventors: Sang G. Kim, San Diego, CA (US);
Young C. Yoon, San Diego, CA (US);
Suk Woo Lee, San Diego, CA (US);
Li-Hsiang Sun, San Diego, CA (US)

(73) Assignee: LG Electronics Inc., Seoul (KR)

( * ) Notice: Subject to any disclaimer, the term of this patent is extended or adjusted under 35 U.S.C. 154(b) by 938 days.

(21) Appl. No.: 11/924,419

(22) Filed: Oct. 25, 2007

(65) Prior Publication Data

US 2008/0117853 A1    May 22, 2008

Related U.S. Application Data

(60) Provisional application No. 60/862,927, filed on Oct. 25, 2006, provisional application No. 60/868,303, filed on Dec. 1, 2006, provisional application No. 60/869,094, filed on Dec. 7, 2006.

(51) Int. Cl.
*H04W 4/00* (2009.01)
(52) U.S. Cl. .......... 370/331; 370/431; 370/458
(58) Field of Classification Search .......... 370/229, 370/230, 252, 254, 329, 331, 341, 395.2, 370/395.21, 395.3, 395.31, 431, 458
See application file for complete search history.

(56) References Cited

U.S. PATENT DOCUMENTS

| 7,423,997 | B2 * | 9/2008 | Kuchibhotla et al. | 370/336 |
| 2006/0072533 | A1 | 4/2006 | Smee et al. | |
| 2008/0062936 | A1 * | 3/2008 | He et al. | 370/338 |
| 2008/0259855 | A1 * | 10/2008 | Yoon et al. | 370/329 |
| 2009/0022098 | A1 * | 1/2009 | Novak et al. | 370/329 |

FOREIGN PATENT DOCUMENTS

| JP | 10303849 | 11/1998 |
| JP | 2001359152 | 12/2001 |
| JP | 2002010363 | 1/2002 |
| JP | 2003517802 | 5/2003 |
| JP | 2004200856 | 7/2004 |
| WO | 2005/013509 | 2/2005 |
| WO | 2006121864 | 11/2006 |
| WO | 2007009370 | 1/2007 |

OTHER PUBLICATIONS

Motorola, "Scheduling Support for Voice Services in E-UTRA," R2-052994, 3GPP TSG RAN WG2#49, Nov. 2005.

* cited by examiner

*Primary Examiner* — Seema S. Rao
*Assistant Examiner* — Mon Cheri Davenport
(74) *Attorney, Agent, or Firm* — Lee, Hong, Degerman, Kang & Waimey

(57) ABSTRACT

A method for switching group assignment of an access terminal (AT) includes receiving a control message indicating a current group to which the AT is assigned and an assigned group to which the AT is to be switched, and decoding data in a next-received group interlace which corresponds to the assigned group.

14 Claims, 13 Drawing Sheets

Timing Illustration of Soft Group Switching

Group Setup Message Fields

| Field | Description |
|---|---|
| MAC_Index | Unique identifier of the AT |
| Group_ID | Unique identifier for the group |
| Block_Size | The fundamental block size (e.g. 1 DRCH by 1 Frame) |
| Num_Blocks | Number of blocks assigned to this group |
| First_Block | Address of the first block in the assignment |
| Ordering_Pattern | One of a few choices indicating the order in which the blocks are to be distributed |
| F_Mod_Coding | Coding and modulation for full rate frames |
| H_Mod_Coding | Coding and modulation for half rate frames |
| Q_Mod_Coding | Coding and modulation for quarter rate frames |
| E_Mod_Coding | Coding and modulation for eighth rate frames |
| Interlace_Structure | The pattern and structure of the VoIP interlace |
| Bitmap1_Length | Length of the first bitmap |
| Bitmap2_Length | Length of the second bitmap (if used) |
| Bitmap_Channel | Time frequency resources for the bitmap itself |
| AT_Index | The bitmap position assigned to the AT |
| Interlace_Offset | Offset assigned to the AT indicative of its first transmission |

Fig. 5

| Interlace_Structure, Interlace_Structure_Target | Interlace_Offset, Interlace_Offset_Target | Description |
| --- | --- | --- |
| 0 | 0 | No interlace and interlace offset change |
| 0 | 1 | Interlace_offset changed to a new offset within the same subgroup specified in Interlace_Offset_Target |
| 1 | 0 | Interlace changed to a new interlace assigned for the same or different subgroup. New interlace is specified in Interlace_Structure_Target |
| 1 | 1 | Both interlace and interlace offset are changed to new interlace and interlace offset specified Interlace_Structure_Target and Interlace_Offset_Target, respectively |

Fig. 6

"Time_Duration" Field and Descriptions

| Time_Duration | Description |
| --- | --- |
| 00 | N/A |
| 01 | 1 Superframe |
| 10 | 2 Superframes |
| 11 | 3 Superframes |

Fig. 7

Timing and Graphical Illustration of Hard Group Switching

EFFICIENT RESOURCE UTILIZATION WITH INTERLACE AND/OR INTERLACE OFFSET SWITCHING

CROSS-REFERENCE TO RELATED APPLICATIONS

Pursuant to 35 U.S.C. §119(e), this application claims benefit of priority from provisional patent application Ser. No. 60/862,927, filed Oct. 25, 2006, Ser. No. 60/868,303, filed Dec. 1, 2006, and Ser. No. 60/869,094, filed Dec. 7, 2006, the contents of which are hereby incorporated by reference herein in their entirety

FIELD OF THE INVENTION

The present invention generally relates to wireless communications, and in particular, to switching group assignment of an access terminal operable with a wireless communication network.

DISCUSSION OF THE RELATED ART

Ultra Mobile Broadband (UMB) combines the best aspects of CDMA, TDM, Layer Superposed (LS)-OFDM, OFDM, and OFDMA into a single air interface using sophisticated control and signaling mechanisms and advanced antenna techniques in order to deliver ultra-high fixed and mobile broadband performance.

UMB supports a forward link up to 288 Mbps and a reverse link up to 75 Mbps while mobile and an average network latency of 16.8 msec. Furthermore, voice over IP (VoIP) of more than 500 simultaneous users over 10 MHz is facilitated while mobile. Moreover, UMB will enable the convergence of IP-based voice, broadband data, multimedia, information technology, entertainment and consumer electronic services.

UMB can efficiently support OFDMA MAC/Physical and fully support centralized as well as distributed access networks. Inter-access network interfaces are streamlined and fast layer 2 handoff is supported with seamless handoff across air interface revision boundaries.

FIG. 1 illustrates a UMB centralized access network support. As illustrated in FIG. 1, each access terminal (AT) maintains a separate protocol stack for each access network (AN) in the active set, with each protocol stack called a "route." Furthermore each base station controller (BSC) is a separate AN.

FIG. 2 illustrates a UMB distributed access network. As illustrated in FIG. 2, each AT in this network arrangement maintains a separate protocol stack for each AN in the active set and each cell is a separate AN.

UMB simplifies the inter-AN interface by requiring each AT to support multiple routes. A simpler inter-eBS interface leads to standardized, inter-operable implementations.

Each eBS in the active set uses a separate data route and there is no need to transfer RLP and header compression states between eBSs. Traffic flowing between an eBS and an AT can be tunneled through the serving eBS, thereby supporting fast and seamless re-pointing between cells.

Signaling messages of protocols between an eBS and an AT can be tunneled through the serving eBS. No eBS has to maintain a connection state of other eBSs in the active set.

UMB layering also reduces the number of protocols in the data path. FIG. 3 illustrates UMB layers in which the application layer provides a signaling application, IP, RoHC, EAP and inter-technology tunneling. The radio link layer provides RLP and associated protocols. The MAC layer provides a packet consolidation protocol and control of physical layer channels. The physical layer defines characteristics of air interface channels. The security functions are protocols for ciphering, message integrity, and key exchange. The route control plane controls the creation and maintenance of air interface protocol stacks, one for each eBS. The session control plane provides session negotiation. The connection control plane controls the connection between the AT and an eBS.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for switching group assignment of an AT includes receiving a control message indicating a current group to which the AT is assigned and an assigned group to which the AT is to be switched, and decoding data in a next-received group interlace which corresponds to the assigned group.

According to one feature, the control message comprises a group assignment message.

According to another feature, the control message comprises an overhead message.

According to yet another feature, the method further includes communicating an acknowledgement (ACK) indicating receipt of the assigned group indication of the control message.

According to still yet another feature, the method further includes switching group assignment of the AT from the current group to the assigned group.

According to one aspect, the data comprises grouped resource allocation (GRA) bitmap data.

According to another aspect, the control message comprises an assignment type field for causing the switching of the group assignment of the AT.

According to yet another, the acknowledgement (ACK) comprises an upper layer ACK.

According to still yet another aspect, the method further includes terminating decoding of data by the access terminal (AT) of a group interlace which corresponds to the current group.

According to one feature, the interlace offset switching of the access terminal (AT) is accomplished by a method that includes identifying in the control message an indication of a current interlace offset assigned to the AT and an assigned interlace offset to which the AT is to switch, communicating an acknowledgement (ACK) indicating receipt of the assigned interlace offset of the control message, switching interlace offset of the AT from the current interlace offset to the assigned interlace offset, decoding the data in a next-received interlace offset which corresponds to the assigned interlace offset.

In accordance with another embodiment, a method for interlace offset switching of an access terminal (AT) includes receiving a control message indicating a current interlace offset assigned to the AT and an assigned interlace offset to which the AT is to switch, decoding data in a next-received interlace offset which corresponds to the assigned interlace offset.

In accordance with yet another embodiment, a method for interlace offset switching of an access terminal (AT) by a network entity includes transmitting a control message indicating a current interlace offset assigned to the AT and an assigned interlace offset to which the AT is to switch, and transmitting data to be decoded in a next-transmitted interlace offset which corresponds to the assigned interlace offset.

In accordance with still yet another embodiment, a method for switching group assignment of an access terminal (AT) by a network entity includes transmitting a control message indicating a current group to which the AT is assigned and an assigned group to which the AT is to switch, and transmitting data in a next-assigned group interlace which corresponds to the assigned group.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 5 depicts a table containing various fields and associated description of a typical group setup message.

FIG. 6 depicts a table containing various values and associated description and corresponding values.

FIG. 7 depicts a table containing various values and associated description for the Time_Duration field.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Providing voice services over packet communications systems has garnered considerable attention because of the inherent benefits of packet communications such as efficient resource utilization, enhanced performance in terms of voice quality and capacity, supporting various qualities of services (QoS) requirements, and the like. Packet voice services have been introduced in cellular communications and voice over internet protocol (VoIP) technologies. Enhanced voice quality stems from the introduction of hybrid automatic retransmission request (H-ARQ).

Figure 1:
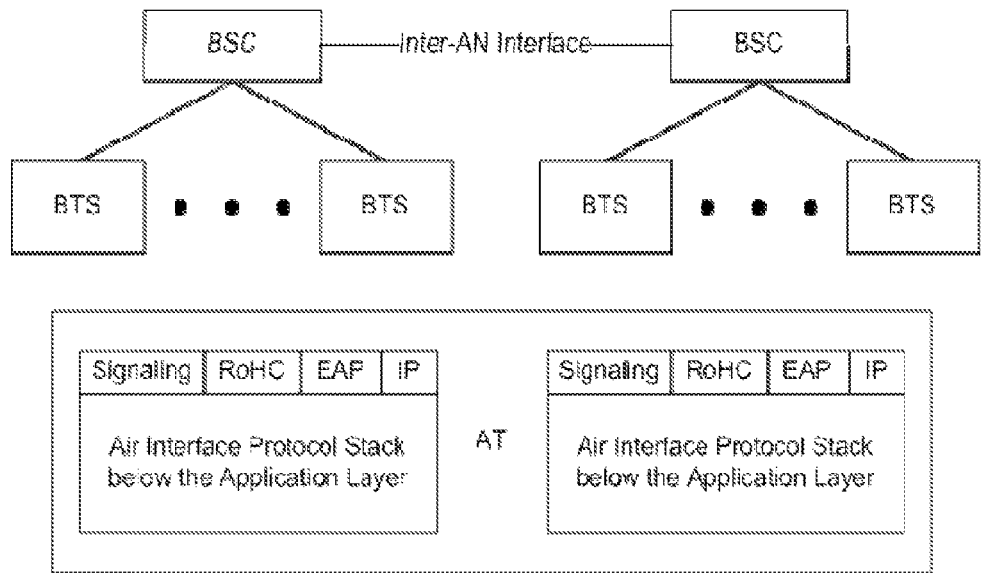
FIG. 1 illustrates a UMB centralized access network.
Figure 2:
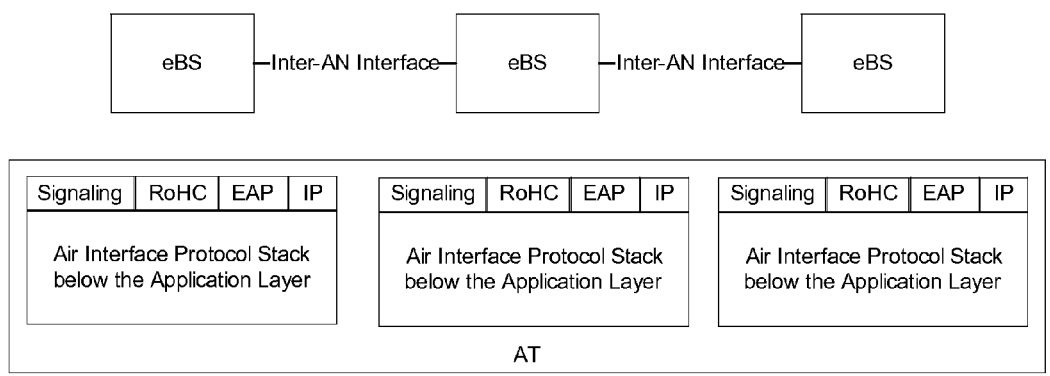
FIG. 2 illustrates a UMB distributed access network.
Figure 3:
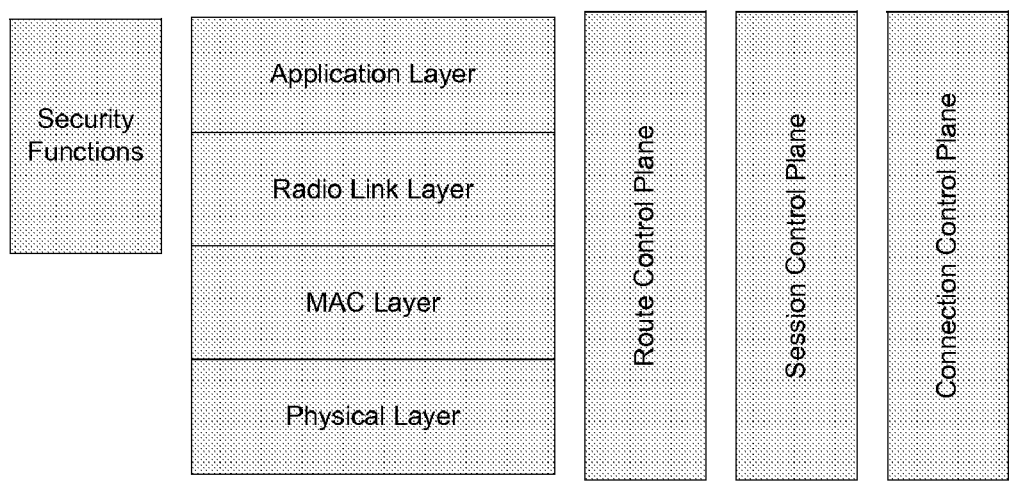
FIG. 3 illustrates UMB layers in which the application layer provides a signaling application, IP, RoHC, EAP and inter-technology tunneling.
Figure 4:
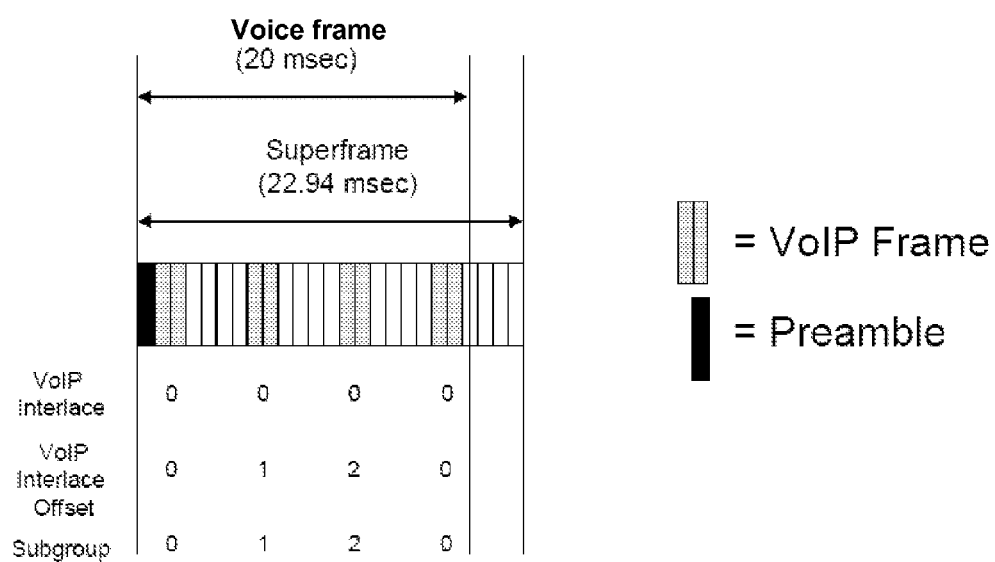
FIG. 4 depicts an example of mapping of VoIP subpacket transmissions over a transmission frame.

FIG. 4 depicts an example of a mapping of subpacket transmission over a transmission frame. A typical H-ARQ retransmission scheme includes a maximum of four transmissions over a 20 ms voice frame. Each transmission from an access terminal (AT) occurs over the same interlace. An interlace is shown having three instances of a subpacket transmission and which is referred to as an "interlace offset." Transmission of the first subpacket from ATs of a certain specific group can be distributed over four interlaces, for example, to balance the load.

As shown in FIG. 4, each AT may be mapped to one or more subgroups depending on specific conditions (e.g., modulation order due to channel conditions, QPSK, 8PSK, or 16QAM subgroup). To reflect variation of the channel conditions (e.g., because of mobility) is useful to support a subgroup change during a VoIP call. In addition, to support efficient utilization of traffic resources, it is further useful to support interlace offset change during the VoIP call and within a group.

Two generalized examples will now be discussed, and which may be implemented to provide features such as supporting efficient utilization of resources, accommodating increased numbers of ATs, while providing acceptable QoS levels. These examples will be referred to as group switching and interlace offset switching. Combination of both examples may also be implemented.

With regard to group switching, it is understood that a subgroup is typically formed based on the channel conditions of the AT. For example, an AT located near the center of a serving cell may be assigned to a particular modulation subgroup (16QAM) because it experiences relatively good channel conditions, while an AT located near the cell edge may be assigned to a different modulation subgroup (QPSK). Consider a situation in which during a VoIP call, for example, an AT transitions into channel conditions of a different modulation subgroup (e.g., from good conditions to poor conditions, and vice versa).

As a specific example, an AT is initially located near the cell edge (QPSK) but moves in a manner approaching the center of the cell. If the AT is maintained as part of its initial modulation group (QPSK), the utilized modulation is more than sufficient to maintain communications at locations in which 16QAM modulation may be sufficient. In this scenario, maintaining the QPSK modulation results in an unnecessary waste of resources.

In general, the transmission start times of the first subpacket from ATs in the same subgroup are distributed over interlace offsets to balance the load. However, load balancing is not assured over time because of the sporadic activity of VoIP traffic. For example, consider that the VoIP traffic load from the same subgroup and/or different subgroups are initially evenly distributed over the interlace offsets. Some interlace offsets can be highly utilized and other interlace offsets are lightly loaded, thus a desired load balancing is broken. To compensate, a redistribution of traffic load is desirable to relieve the burden of the scheduler and provide the desired QoS (e.g., delay).

Interlace switching can be considered as inter-group switching, and interlace offset switching may be considered intra-group switching. Two generalized approaches for implementing group switching will be referred to as soft group switching and hard group switching.

First of all, the standards organization 3GPP2 includes a joint harmonized proposal for loosely backward compatible (LBC) frequency division duplexing (FDD). Consider, for example, the group setup message for VoIP. This message is defined and managed through upper layer signaling carried on the forward data channel (F-DCH). FIG. 5 depicts a table containing various fields and associated description of a typical group setup message. In an embodiment, the group setup message may further or alternatively include one or more additional fields which will be referred to as Interlace_Offset_Target and Interlace_Structure_Target.

Note that if the Interlace_Structure_Target field does not carry information relating to the interlace index, a further field may be included in the group setup message. This field will be referred to as Interlace_Index and Interlace_Index_Target. FIG. 6 depicts a table containing various values and associated description which correspond to such values. As an example, the "0" values denote that there is no difference between these fields implying no interlace (group) switching, and the "1" values denote that there is a difference between the fields implying interlace (group) switching.

One technique for expediting interlace switching and/or offset switching may be accomplished by transmitting the same data over the current and target interlaces and/or offsets for a predefined time duration (e.g., 1, 2, or 3 superframes). This aspect may alternatively be implemented using a field which will be referred to as Time_Duration. This technique is conceptually similar to soft handoff to the extent that current and target interlaces and/or interlace offsets transmit the same data.

Another technique for expediting interlace switching and/or offset switching includes configuring the group setup message with additional fields which will be referred to as Time_Duration and Interlace_Index fields. An example of this technique is depicted in FIG. 7, which depicts a table containing various values and associated description for the Time_Duration field.

According to this technique, the Interlace_Index field carries the index of a new (target) interlace. A new interlace and/or interlace offset will overwrite existing interlace and/or interlace offset values. This will be effective after the time duration specified in the Time_Duration field. One reason for implementing this field is that the interlace and/or interlace offset change may be achieved on a per packet basis, not on a per subpacket basis. Since the first subpacket transmission time is distributed over four interlace offsets, for example, a VoIP packet transmission may occur over a superframe. This technique is conceptually similar to sector switching to the extent that a better interlace and/or interlace offset are identified which permits transmission from this better interlace and/or interlace offset.

A third technique for expediting interlace switching and/or offset switching includes configuring the group setup message with an Interlace_Index. To use the same group setup message for interlace switching, it is desirable to specify the purpose of this group setup message. For example, the group setup message may be used for initial group assignment or for group switching. To accomplish this identification aspect of the group setup message, an additional field may be added. This additional field will be referred to as a Message_Type field with certain number of bits. For instance, if the Message_Type field is defined by one bit, the value "0" may be used to indicate an initial group setup and the value "1" may be used to indicate group switching. In this example, the Interlace_Index and Interlace_Offset fields denote the target interlace and interlace offset. If desired, multiple Interlace_Index and Interlace_Offset fields may be implemented to support multiple interlace switching. Such an arrangement is useful when the AT is assigned multiple interlaces and/or interlace offsets.

Figure 8:
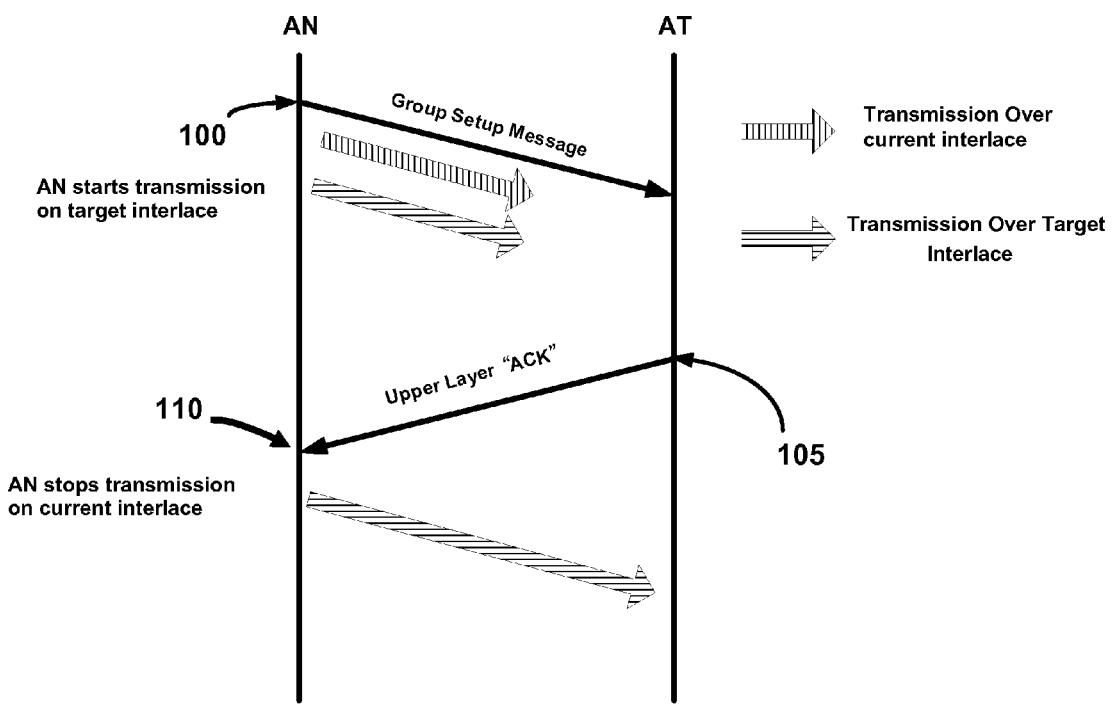
FIG. 8 is a timing diagram depicting an example of soft group switching.

FIG. 8 is a timing diagram depicting an example of soft group switching. This figure depicts one technique for implementing interlace and/or interlace offset switching in conjunction with on-going VoIP traffic transmitted over the interlaces/offsets. In particular, this figure depicts transmission over the current and target interlaces/offsets.

At point 100, the AN transmits the group setup message for the purpose of interlace and/or interlace offset switching. At about the same time, VoIP traffic (subpacket) is transmitted over the current and target interlaces/interlace offsets. The transmission of group setup message is not a frequently transmitted message to the extent that it is an event driven message.

At point 105, the AT receives various transmissions from the AN. In an embodiment, the AT may combine both transmissions and send an acknowledgement (ACK) or a negative acknowledgement (NAK) in accordance with physical layer H-ARQ techniques. If desired, an upper layer ACK/NAK may be used. This transmission is typically transmitted over the current and target interlace/offset. At this stage, the AT will typically terminate use of the reverse ACK channel (R-ACKCH) on the current interlace, and replace this channel with the RACKCH on the target interlace.

At point 110, the AN receives the ACK, for example, from the AT. The AN responsively or at some later point in time transmits the VoIP traffic over only the target interlace/interlace offset; transmission of the previously current interlace/interlace offset is halted or otherwise terminated. Such terminating typically occurs after the AT has received and successfully decoded data on the target group interlace. The target interlace/interlace offset may then be referred to as the current interlace/interlace offset.

Utilization of the same VoIP traffic (subpackets) received from two interlaces will typically vary based upon the implementation. For example, both subpackets can be combined and an ACK or NAK transmission can be sent over the current interlace.

Figure 9:
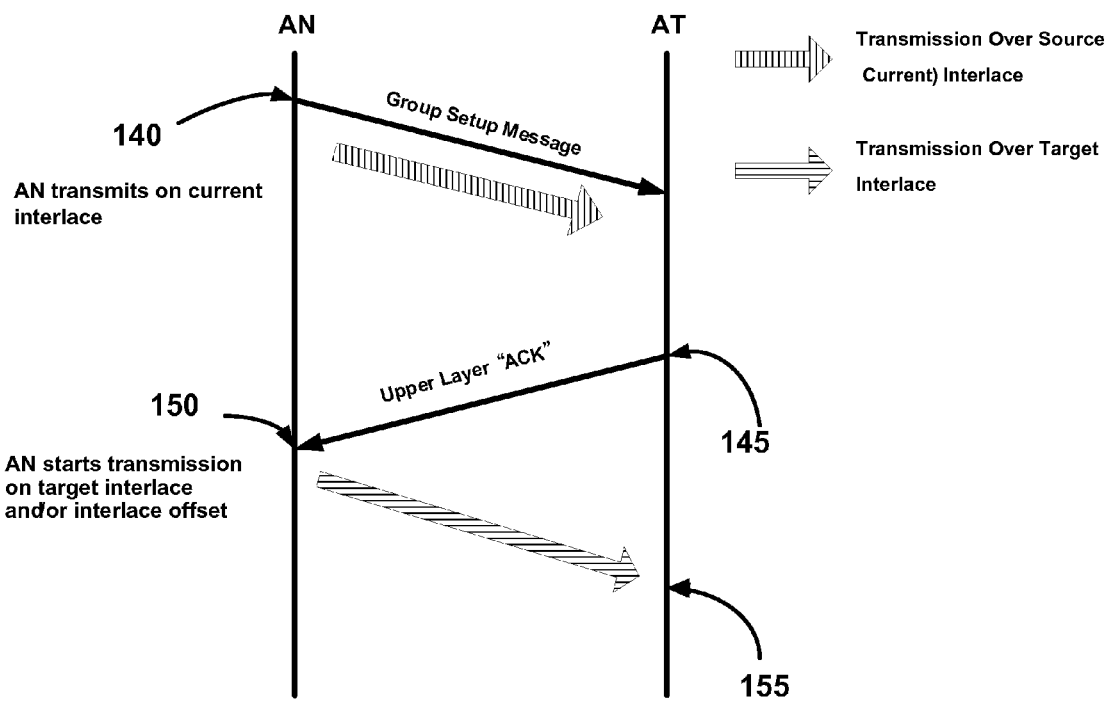
FIG. 9 is a timing diagram depicting an example of hard group switching.

FIG. 9 is a timing diagram depicting an example of hard group switching. This figure depicts another technique for implementing interlace and/or interlace offset switching in conjunction with on-going VoIP traffic transmitted over the interlaces/offsets.

At point 140, the AN transmits the group setup message for the purpose of interlace and/or interlace offset switching. At about the same time, VoIP traffic (subpackets) are transmitted over only the current interlace/interlace offset.

At point 145, the AT receives various transmissions from the AN. In an embodiment, the AT sends an ACK or NAK, as the situation dictates, over the current interlace/interlace offset. It may be a physical layer or upper layer ACK/NAK. During this period, the AT will typically monitor both the current and target interlaces/interlace offsets.

At point 150, the AN receives an ACK, for example, from the AT. The AN responsively or at some later point in time transmits the VoIP traffic using only the target interlace/interlace offset. Transmission of the previously current interlace/interlace offset is halted.

At point 155, the AT receives the transmission on the target interlace/interlace offset, and then subsequently halts monitoring on the current interlace/interlace offset.

In general, an upper layer ACK includes a radio link protocol (RLP) ACK. The second approach depicted in FIG. 9 may also be used for offset switching in the same interlace. For instance, after an upper layer ACK, the AT typically monitors both the current and target offsets because the AT does not know the transmission time over the target offset. However, when the transmission over the target offset is detected and decoded successfully, the AT stops monitoring the previous offset (as described above). If the target transmission is on a different interlace, then the AT is not required to decode both channels and can switch to the target interlace if it receives the bitmap with a flag from the target interlace.

The techniques described in conjunction with FIGS. 8 and 9, for example, may also be implemented in reverse link transmissions using bitmap approach, and to group-based transmission systems which are not tied to interlace-based transmission. An AT from such a group can be reassigned to any other group.

Consider the embodiment in which one group is allowed per interlace and there is a one-to-one mapping between the group and interlace. Such an embodiment may include the field "Group ID" to denote the target group if the Message Type denotes group switching. If more than one group is allowed per interlace, or if the same group can be allowed more than one interlace and/or interlace offset, then Group ID, Interlace_Index, and Interlace_Offset can be represented by target group ID, target interlace, and interlace offset, respectively.

If desired, an AT can be assigned to multiple groups in the same or different interlaces and/or interlace offset by placing it into multiple groups or the AT can be assigned to multiple interlaces by placing it into the same group. We can assign ATs requiring multiple assignments to support a certain QoS parameter by placing them into a common group and by allocating multiple interlace and/or interlace offsets to the AT.

When interlace offset switching (intra-group switching) is required, the Group ID field is the same and the Interlace_Offset field denotes the target interlace offset. On the other hand, when interlace switching (inter-group switching) is required, the Group ID field denotes an interlace if there is a one-to-one mapping between the group and interlace. In this example, the Group ID and Interlace_Index fields denote the target group ID and interlace, respectively, if there is no one-to-one mapping between the group and interlace.

As a further alternative, a Switch Mode field may be included to specify which switching mode is to be implemented. For instance, the Switch Mode field may be used to specify one of the following modes: Soft Group Switching, Hard Group Switching, or Timer-based Switching.

Note that the above description is based on a typical group setup message. However, an additional message may be implemented for the purpose of group (interlace) switching. It can contain a fewer number of fields than the depicted group setup message.

Figure 10:
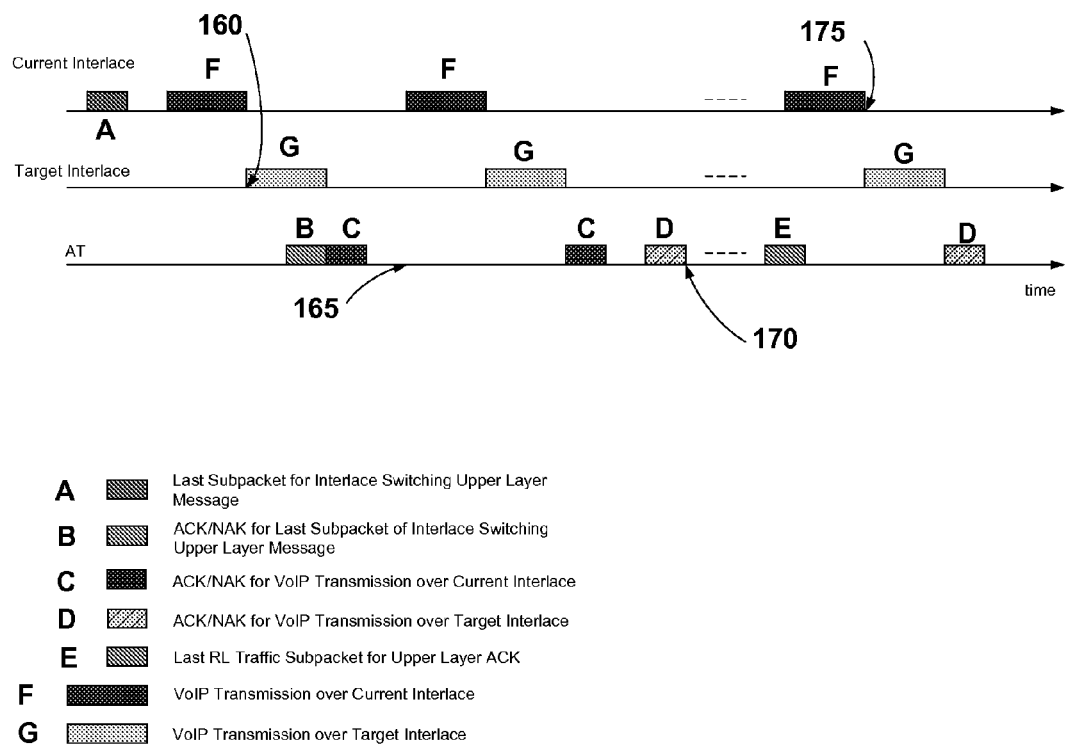
FIG. 10 is a timing diagram for a soft group switching technique, an example of which is depicted in FIG. 8.

FIG. 10 is a timing diagram for the soft group switching technique, an example of which is depicted in FIG. 8. Various types of subpackets are depicted in the legend and are denoted as subpackets A-G. This diagram depicts subpacket transmission for both the current and target interlace.

Initially, subpackets A and F are transmitted over the current interlace. At point 160, the AN may begin transmission on the target interlace (subpacket G). This typically occurs after the AN finishes sending the last subpacket for the interlace switching upper layer message.

The AT is shown sending ACK/NAK subpackets B and C. At point 165, the AT may start to monitor both the current and target interlaces. At point 170, the AT stops monitoring the current interlace and the AN subsequently stops the forward link traffic transmission over the current interlace after the AN receives the upper layer ACK from the AT, for example.

Figure 11:
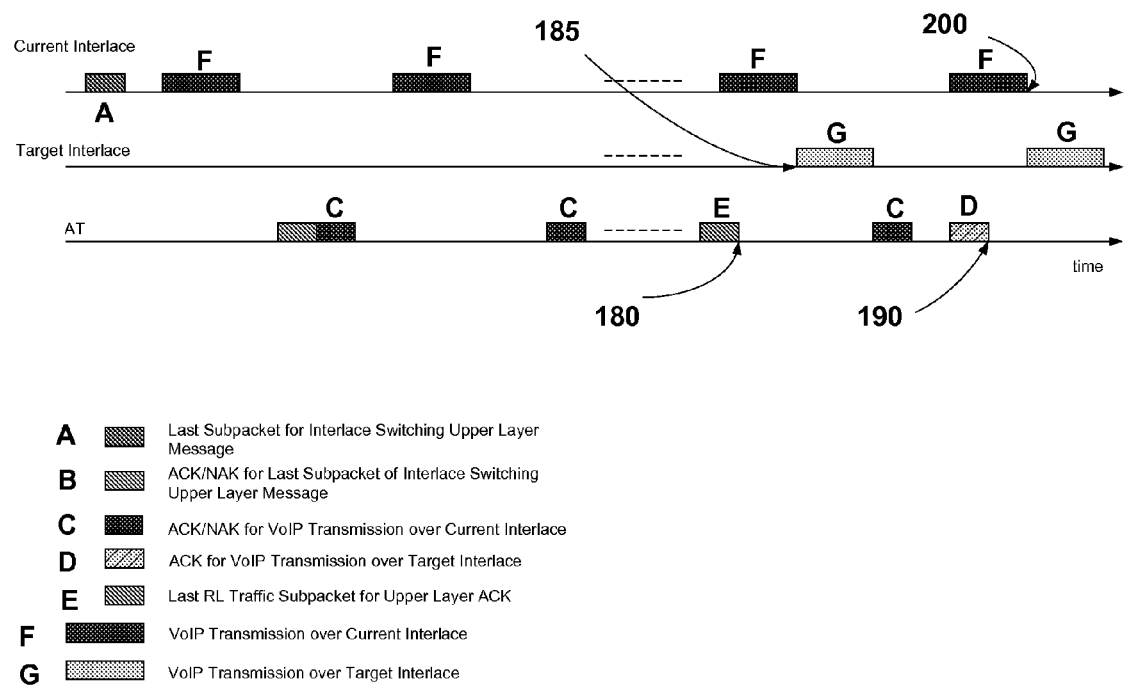
FIG. 11 is a timing diagram for a hard group switching technique, an example of which is depicted in FIG. 9.

FIG. 11 is a timing diagram for the hard group switching technique, an example of which is depicted in FIG. 9. Various types of subpackets are depicted in the legend and are denoted as subpackets A-G. This diagram depicts subpacket transmission for both the current and target interlace.

Initially, subpackets A and F are transmitted over the current interlace. At point 180, the AT starts to monitor both the current and target interlaces. At point 185, the AN may begin transmission on the target interlace (subpacket G). This typically occurs after the AN receives the ACK from the AT. At point 190, the AT stops monitoring the current interlace. At point 200, the AN subsequently stops transmission over the current interlace after the AN receives the upper layer ACK from the AT, for example.

Figure 12:
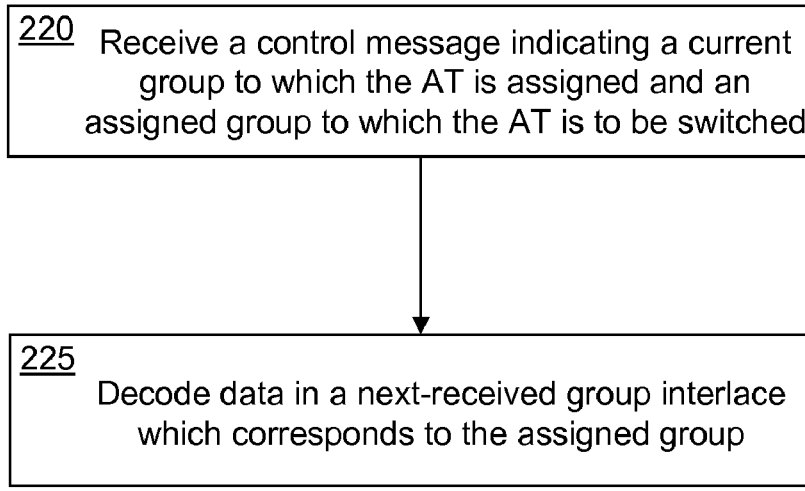
FIG. 12 is a flowchart depicting a method for switching group assignment of an AT in accordance with an embodiment of the present invention.

FIG. 12 is a flowchart depicting a method for switching group assignment of an AT in accordance with an embodiment of the present invention. Block 220 includes receiving a control message indicating a current group to which the AT is assigned and an assigned group to which the AT is to be switched. Block 225 relates to decoding data in a next-received group interlace which corresponds to the assigned group.

Figure 13:
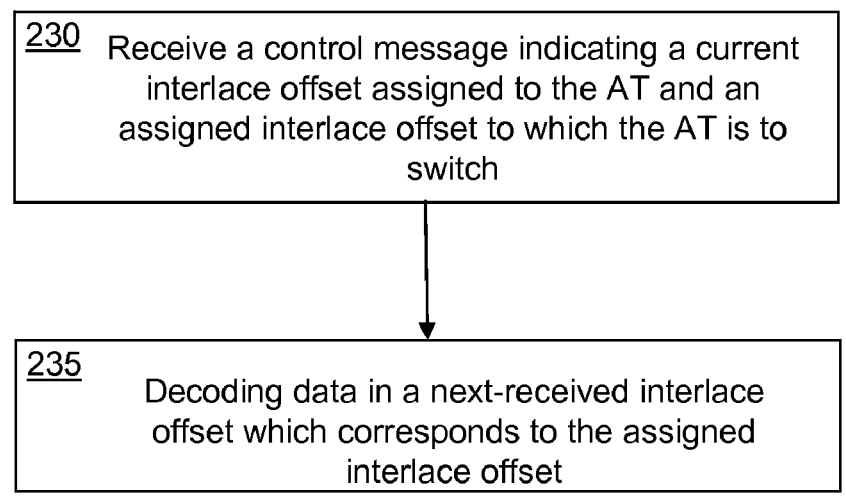
FIG. 13 is a flowchart depicting a method for interlace offset switching of an AT in accordance with another embodiment of the present invention.

FIG. 13 is a flowchart depicting a method for interlace offset switching of an access terminal (AT) in accordance with another embodiment of the present invention. Block 230 includes receiving a control message indicating a current interlace offset assigned to the AT and an assigned interlace offset to which the AT is to switch. Block 235 includes decoding data in a next-received interlace offset which corresponds to the assigned interlace offset.

Figure 14:
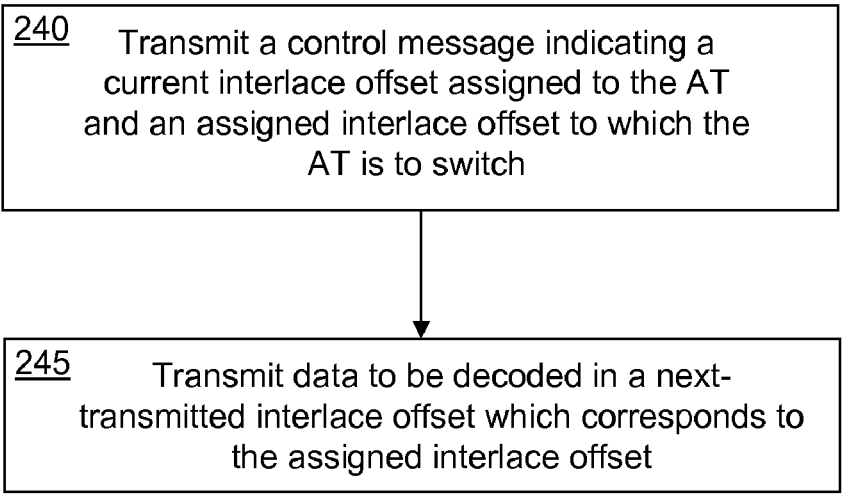
FIG. 14 is a flowchart depicting a method for interlace offset switching of an AT by a network entity in accordance with yet another embodiment of the present invention.

FIG. 14 is a flowchart depicting a method for interlace offset switching of an AT by a network entity in accordance with yet another embodiment of the present invention. Block 240 includes transmitting a control message indicating a current interlace offset assigned to the AT and an assigned interlace offset to which the AT is to switch. Block 245 relates to transmitting data to be decoded in a next-transmitted interlace offset which corresponds to the assigned interlace offset.

Figure 15:
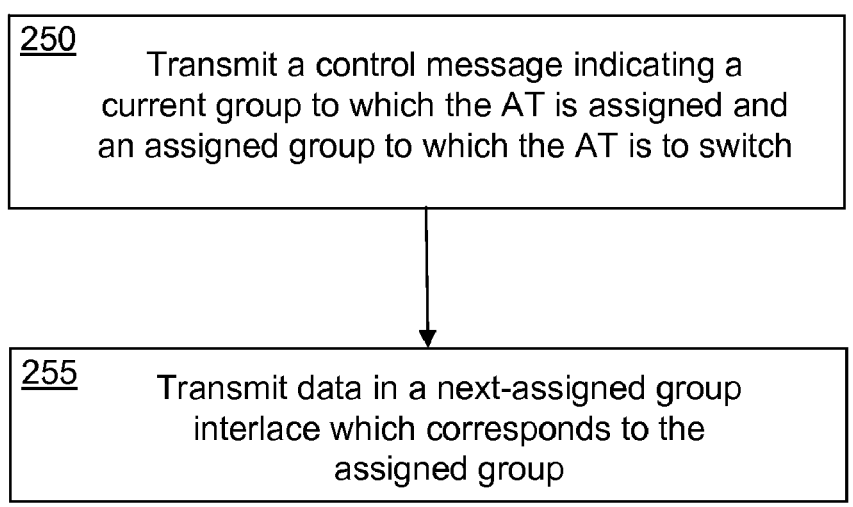
FIG. 15 is a flowchart depicting a method for switching group assignment of an AT by a network entity in accordance with still yet another embodiment of the present invention.

FIG. 15 is a flowchart depicting a method for switching group assignment of an AT by a network entity in accordance with still yet another embodiment of the present invention. Block 250 relates to transmitting a control message indicating a current group to which the AT is assigned and an assigned group to which the AT is to switch. Block 255 recites transmitting data in a next-assigned group interlace which corresponds to the assigned group.

In addition to the above embodiments, such techniques may be applied to switching of the interlace and/or interlace offset read by an AT. For example, an AT (e.g., receiving HTTP traffic) may be listening to interlace 1 and capable of being switched to listen to interlace 3.

Although embodiments of the present invention may be implemented using the exemplary series of operations described herein, additional or fewer operations may be performed. Moreover, it is to be understood that the order of operations shown and described is merely exemplary and that no single order of operation is required.

Figure 16:
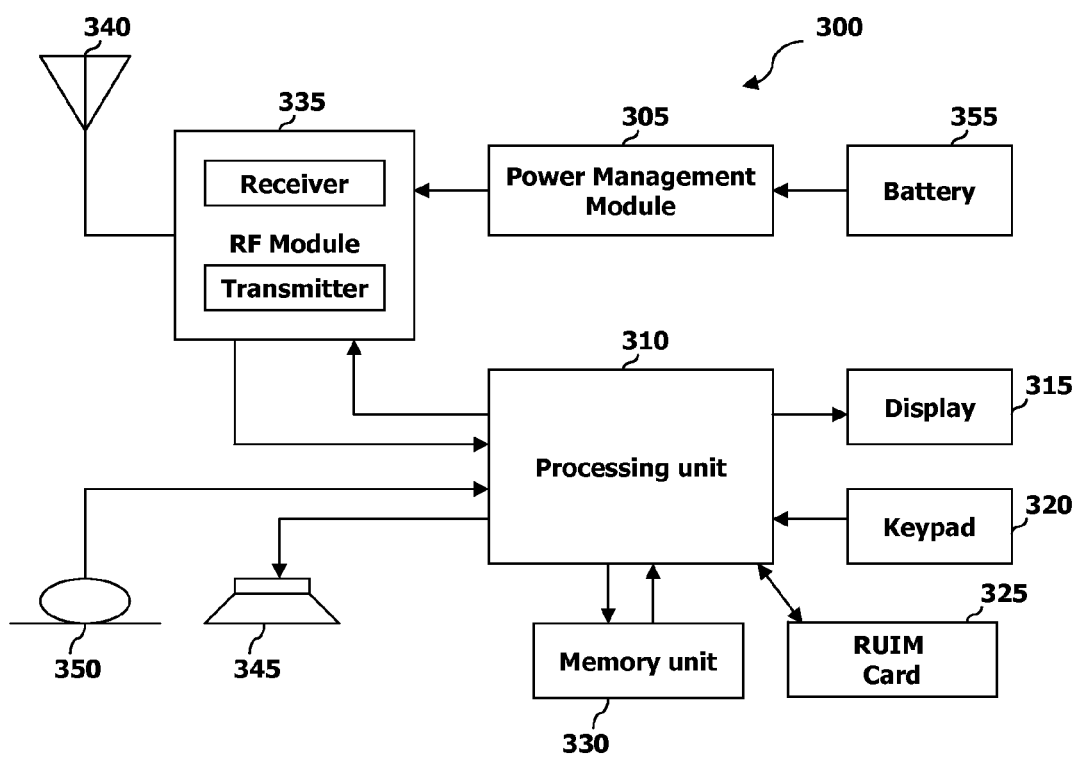
FIG. 16 is a block diagram of mobile communication device, which may be configured as an AT in accordance with embodiments of the present invention.

FIG. 16 is a block diagram of mobile communication device 300, which may be configured as an AT in accordance with embodiments of the present invention. Device 300 is illustrated, for example, as a mobile phone and may be configured to perform various methods described herein. The mobile communication device 300 includes a processing unit 310 such as a microprocessor or digital signal processor, RF module 335, power management module 305, antenna 340, battery 355, display 315, keypad 320, optional removable user identity module (RUIM) card 325, memory unit 330 such as flash memory, ROM or SRAM, speaker 345 and microphone 350.

A user enters instructional information, such as a telephone number, for example, by pushing the buttons of keypad 320 or by voice activation using microphone 350. Processing unit 310 receives and processes the instructional information to perform the appropriate function, such as to dial the telephone number. Operational data may be retrieved from memory unit 330 to perform the function. Furthermore, processing unit 310 may display the instructional and operational information on display 315 for the user's reference and convenience.

Processing unit 310 issues instructional information to RF section 335, to initiate communication, for example, transmit radio signals comprising voice communication data. RF section 335 comprises a receiver and a transmitter to receive and transmit radio signals. Antenna 340 facilitates the transmission and reception of radio signals. Upon receiving radio signals, RF module 335 may forward and convert the signals to baseband frequency for processing by processing unit 310. The processed signals would be transformed into audible or readable information outputted via speaker 345, for example.

Processing unit 310 is adapted to perform various methods disclosed herein, among other operation. It will be apparent to one skilled in the art that mobile communication device 300 may be readily implemented using, for example, processing unit 310 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMB. The present invention is also applicable to other wireless communication systems using different air interfaces and/or physical layers, for example, UMTS, TDMA, CDMA including 1xEV-DO, FDMA, WCDMA including HSDPA, HSUPA, and beyond, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

Although the present invention may be implemented using the exemplary series of operations described herein, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for switching group assignment of an access terminal (AT), belonging to a group, where the group is assigned a group interlace and the AT is assigned an interlace offset for the AT's first subpacket transmission on the group interlace the method comprising:
   receiving a control message from a network entity, the control message indicating a current group to which the AT is assigned and a target group to which the AT is to be switched;
   decoding data over a current group interlace corresponding to the current group and a target group interlace corresponding to the target group; and
   transmitting an acknowledgement (ACK) indicating receipt of the target group indication of the control message to the network entity, and decoding the data over only the target group interlace.

2. The method according to claim 1, wherein the control message comprises a group assignment message.

3. The method according to claim 1, wherein the control message comprises an overhead message.

4. The method according to claim 1, wherein the data comprises grouped resource allocation (GRA) bitmap data.

5. The method according to claim 1, wherein the control message comprises an assignment type field for causing the switching of the group assignment of the AT.

6. The method according to claim 1, wherein the acknowledgement (ACK) comprises an upper layer ACK.

7. The method according to claim 1, wherein the control message further includes an indication of a current interlace offset assigned to the AT and assigned target interlace offset to which the AT is to switch;
   transmitting an acknowledgement (ACK) indicating receipt of the target interlace offset of the control message to the network entity;

switching interlace offset of the AT from the current interlace offset to the assigned interlace offset; and decoding the data in the next interlace offset.

8. A method for interlace offset switching of an access terminal (AT) belonging to a group, where the group is assigned a group interlace and the AT is assigned an interlace offset for the AT's first subpacket transmission on the group interlace, the method comprising:

receiving a control message from a network entity, the control message indicating a current interlace offset assigned to the AT and a target interlace offset to which the AT is to switch;

decoding data in the current and target interlace offsets;

transmitting an acknowledgement (ACK) indicating receipt of the target interlace offset of the control message to the network entity; and switching interlace offset of the AT from the current interlace offset to the target interlace offset.

9. A method for interlace offset switching of an access terminal (AT) belonging to a group by a network entity, where the group is assigned a group interlace and the AT is assigned an interlace offset for the AT's first subpacket transmission on the group interlace, the method comprising:

transmitting a control message to the AT, the control message indicating a current interlace offset assigned to the AT and a target interlace offset to which the AT is to switch; transmitting data to be decoded in the current and target interlace offsets; and transmitting data to be decoded to the AT in only the target interlace offset in response to receiving an acknowledgement (ACK) from the AT indicating receipt of the target interlace offset of the control message.

10. A method for switching group assignment of an access terminal (AT) belonging to a group by a network entity, where the group is assigned a group interlace and the AT is assigned an interlace offset for the AT's first subpacket transmission on the group interlace, the method comprising:

transmitting a control message to the AT, the control message indicating a current group to which the AT is assigned and target group to which the AT is to switch;

transmitting data over a current group interlace corresponding to the current group and a target group interlace corresponding to the target group; and transmitting data over only the target interlace in response to receiving an acknowledgement (ACK) from the AT indicating receipt of the target group indication of the control message.

11. The method according to claim 1, wherein in decoding the data over the current and target group interlaces, the data is decoded for a predefined time duration.

12. The method according to claim 8, wherein in decoding the data in the current and target interlace offsets, the data is decoded for a predefined time duration.

13. The method according to claim 9, wherein in transmitting the data in the current and target interlaces offsets, the data is transmitted for a predefined time duration.

14. The method according to claim 10, wherein in transmitting the data over the current and target group interlaces, the data is transmitted for a predefined time duration.

* * * * *